United States Patent
Crawford, Jr. et al.

(10) Patent No.: US 7,322,034 B2
(45) Date of Patent: Jan. 22, 2008

(54) METHOD AND SYSTEM FOR DYNAMICALLY ALLOCATING COMPUTER SYSTEM RESOURCES

(75) Inventors: Isom L. Crawford, Jr., Royse City, TX (US); Michael D. Murphy, Allen, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 698 days.

(21) Appl. No.: 10/170,642

(22) Filed: Jun. 14, 2002

(65) Prior Publication Data

US 2003/0233391 A1 Dec. 18, 2003

(51) Int. Cl.
G06F 3/00 (2006.01)
G06F 9/46 (2006.01)

(52) U.S. Cl. ...................... 719/310; 718/104
(58) Field of Classification Search ................ 719/310; 718/104
See application file for complete search history.

(56) References Cited

U.S. PATENT DOCUMENTS

| | | | |
|---|---|---|---|
| 5,247,634 A | 9/1993 | Cline et al. | |
| 5,668,995 A | 9/1997 | Bhat | |
| 5,727,178 A | 3/1998 | Pletcher et al. | |
| 5,784,616 A | 7/1998 | Horvitz | |
| 5,790,862 A | 8/1998 | Tanaka et al. | |
| 5,889,989 A | 3/1999 | Robertazzi et al. | |
| 5,930,777 A | 7/1999 | Barber | |
| 6,085,216 A * | 7/2000 | Huberman et al. | 718/104 |
| 6,157,917 A | 12/2000 | Barber | |
| 6,209,066 B1 | 3/2001 | Holzle et al. | |
| 6,301,616 B1 * | 10/2001 | Pal et al. | 709/226 |
| 6,336,127 B1 | 1/2002 | Kurtzberg et al. | |
| 6,591,262 B1 * | 7/2003 | MacLellan et al. | 707/2 |
| 6,859,926 B1 * | 2/2005 | Brenner et al. | 718/100 |

* cited by examiner

Primary Examiner—William Thomson
Assistant Examiner—LeChi Truong

(57) ABSTRACT

A method and system are disclosed for allocating computer resources. The method may be implemented in software instructions in a resource allocator that allocates resources among workloads operating on the system. Parameters defining service level objectives for the execution of workloads are received from a user input device. At least one of the service level objectives is a utilization cap that limits the overall allocation of system resources among the workloads. The parameters include priorities for the service level objectives, including the utilization cap. As the workloads execute on the system, utilization data is received indicating usage of system resources. Resources are allocated to the workloads according to the priorities of the service level objectives and based on the utilization data.

3 Claims, 10 Drawing Sheets

METHOD AND SYSTEM FOR DYNAMICALLY ALLOCATING COMPUTER SYSTEM RESOURCES

TECHNICAL FIELD

The technical field relates generally to computer systems. More particularly, the technical field relates to management of computer system resources that are allocated among one or more workloads.

BACKGROUND

Data centers as well as individual computer users may employ a utility, or Pay-Per-Use (PPU) model for allocating computer resources to workloads operating on the system. As used herein, a workload refers to any application, process, or group of processes that uses system resources. Resources may be allocated among workloads using a resource allocator, such as the HP-UX Workload Manager (WLM) product manufactured by Hewlett-Packard Company, to achieve service level objectives (SLOs) for workload operation. A PPU model allows a user to purchase a portion of a computer resource, such as central processing unit (CPU) resources, memory, disk bandwidth, network bandwidth, etc., rather than purchasing the entire computer system and its resources outright. The purchased resource might be expressed as a percent of total system resources. For example, a user who requires only 80% of the total CPU resources might purchase that amount.

PPU systems measure the actual utilization of the system resource by the user to ensure compliance with the purchased amount. Depending upon the configuration, the PPU system may bill the user periodically based on the actual usage, according to an agreement between the user and the provider of the system resources. Depending upon the implementation of the PPU model, it may be desirable to limit the user's utilization below the purchased amount. This may be desirable, for example, in implementations in which the user pays for actual utilization and wants to ensure that this utilization does not exceed a certain limit, or in which the user pays a fixed rate for a limited amount of resources and the resource provider wants to ensure that the user does not receive more resources than the user purchased.

A PPU model allows the user access to the resources and meters the use of the resources. In such a system, it is desirable to control system resource usage in order to prevent utilization from exceeding the amount of resources purchased. Using system resources under a PPU model without limiting that use is analogous to using a furnace without a thermostat. The user could be charged for unexpectedly high utilization of the resources.

A problem with allocating resources is accurately limiting and measuring the use of the resources. Existing resource allocators can only impose a fixed cap on resource allocation using a utilization block to prevent use of a designated portion of the resource. The utilization block prevents access to a fixed amount of resources, regardless of the workloads' actual usage requirements. However, such allocation systems are inherently inaccurate and may be undesirable in many cases. Existing resource allocators operate independently of PPU systems and do not control all workloads operating on the user's system that could be charged to the user under a PPU model. Existing resource allocators therefore cannot accurately limit allocation. For example, the resource allocator itself may require use of an operating system that consumes system resources such as CPU resources, and existing systems may not allow the resource allocator to limit allocation of resources to certain workloads, such as the operating system. As a result, a fixed entitlement available in existing resource allocators using a utilization block will not impose an accurate cap.

For example, if a workload executing on the system results in operating system activity that accounts for 10% of the total CPU resources, only the remaining 90% of the CPU resources is available to be reallocated. If a utilization block is used to block access to 20% of the available CPU resources, then the actual amount of the CPU resources available to the user's workloads after imposition of the utilization block is 72% (80% of 90% total resources). Combining the 72% available to the workloads with the 10% used by the operating system yields a total utilization of 82% of the system resources, rather than the 80% desired by the user. As a result, the user either pays for an additional 2% of the CPU resources, or the user receives 2% more resources than purchased under the PPU arrangement.

A fixed entitlement created by a utilization block is also inflexible. Depending upon the usage patterns, resource requirements of a user's workloads may fluctuate and may be generally well below the maximum cap purchased through the PPU system. It may be desirable under the PPU system for the user to purchase resources based on an average utilization rather than a fixed maximum limit. Under this average utilization PPU model, actual utilization may exceed the purchased cap, so long as average usage is below the purchased amount of resources. Systems using utilization blocks do not permit flexibility, but instead impose only a maximum cap.

SUMMARY

A method is disclosed for allocating computer system resources. Parameters defining service level objectives for the execution of workloads are received from a user input device. At least one of the service level objectives is a utilization cap that limits the overall allocation of system resources among the workloads. The parameters include priorities for the service level objectives, including the utilization cap. As the workloads execute on the system, utilization data is received indicating usage of system resources. Resources are allocated to the workloads according to the priorities of the service level objectives and based on the utilization data.

A computer system is also disclosed that dynamically allocates computer system resources among workloads, subject to a utilization cap. The system includes a processor, a memory connected to the processor, a usage meter that measures utilization of the system resources, and a resource allocator. The resource allocator receives utilization data from the usage meter as the workloads execute on the system. The resource allocator allocates the system resources to the workloads according to priorities specified for service level objectives specified for execution of the workloads. Allocation of resources is subject to a utilization cap, defined by a service level objective also having a priority.

A computer-readable medium is also disclosed having computer-executable instructions for performing a method of allocating computer system resources among workloads executing on a computer system. The method retrieves utilization data for the workloads while the workloads are using the system resources. The method allocates system resources to the workloads based on parameters specified for service level objectives associated with the workloads. The parameters include priorities for the service level objectives, and workloads associated with higher priority service level objectives are allocated resources before workloads associated with lower priority service level objectives. At least one of the service level objectives is a utilization cap of total system resources and has a priority.

DESCRIPTION OF THE DRAWINGS

The detailed description will refer to the following drawings, wherein like numerals refer to like elements, and wherein.

DETAILED DESCRIPTION

Figure 1:
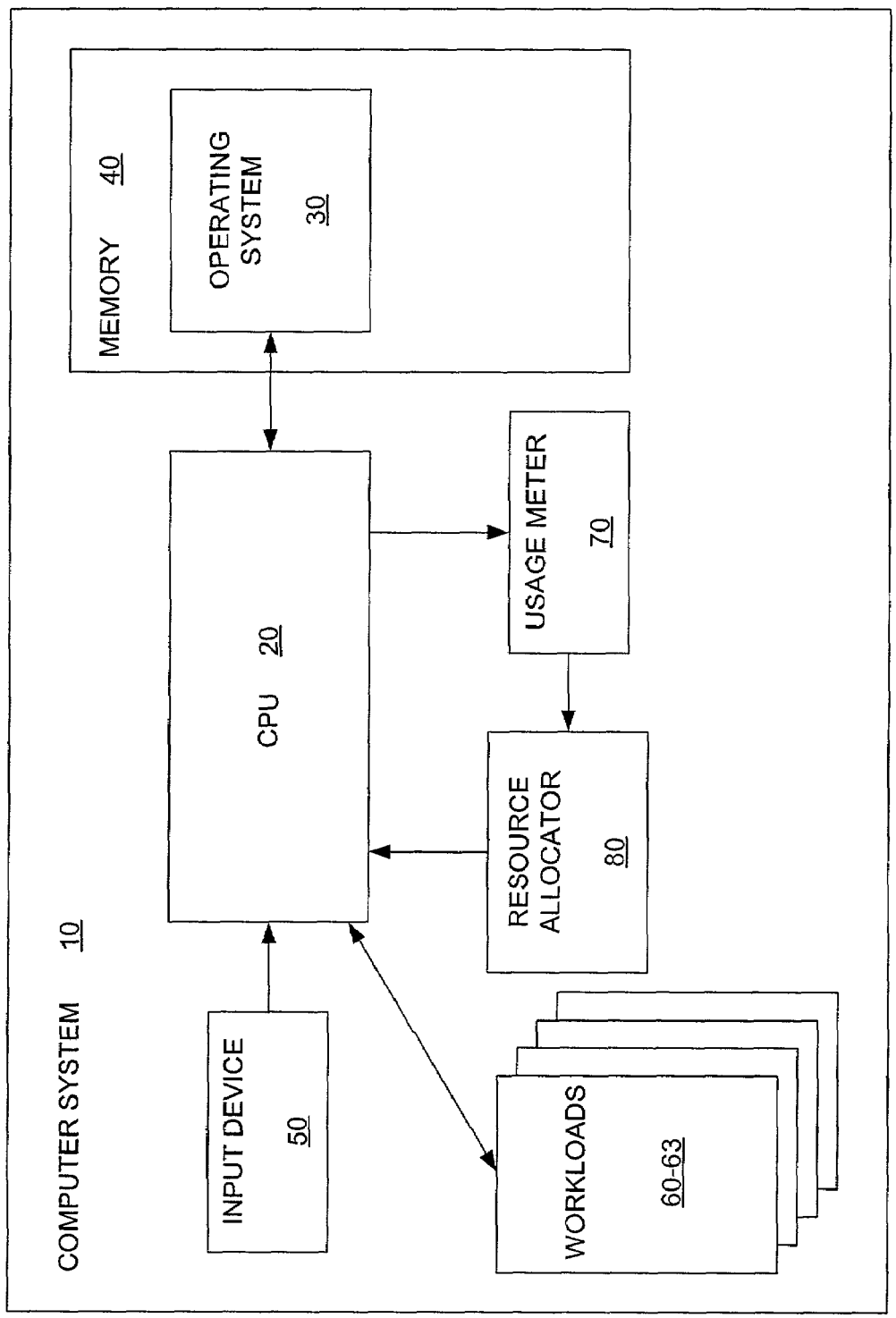
FIG. 1 shows a block diagram of a computer system that allocates system resources among workloads.

FIG. 1 shows a block diagram of a computer system 10 that allocates system resources, such as memory or central processing unit (CPU) resources, among workloads 60-63. The system 10 includes a CPU 20 connected to a memory 40. An operating system 30 resides in the memory 40 for the execution of workloads 60-63 by the CPU 20. In use, the CPU 20 executes workloads 60-63, which require use of system resources, such as CPU resources, memory, disk bandwidth, network bandwidth, etc. For example, in allocating CPU resources, workloads 60-63 executing at the same time may be allocated time slices of access to the CPU 20 or similar allocations in parallel processing systems. System resources are allocated to the workloads 60-63 according to parameters, which may be sent to the CPU 20 using a user input device 50. In one embodiment, the workloads 60-63 are executed by the CPU 20 at a server connected to a network. In other embodiments, the computer system 10 may include multiple servers or on a single computer terminal.

The parameters define service level objectives (SLOs) for execution of the workloads 60-63 on the system 10. As used herein, a service level objective refers to any parameter or group of parameters relating to utilization of system resources by the workloads 60-63. A service level objective includes, for example, identities of workloads 60-63 that share a priority to resources.

Exemplary service level objectives include execution time for workloads 60-63 or software applications, and for output of results from applications. By way of example, a computer system in which one of the software applications prints payroll checks may have as a service level objective a goal to print 1,000 checks per minute, and that service level objective may have a priority of 2. Other software applications running on the system may have service level objectives specified for their execution, along with priorities. The check-printing software application (and the workloads associated with it) may have one or more "stretch" goals that specify related goals. For example, the application may have a stretch goal of printing 1,500 checks per minute, and that stretch goal may have a priority of 5. This indicates that resources should be allocated first to service level objectives having a higher priority than printing 1,000 checks per minute (e.g. priority of 1); then resources are allocated to satisfy the goal of printing 1,000 checks per minute; then resources are allocated to lower priority service level objectives; and if resources remain after satisfying other service level objectives with priorities higher than 5, then resources are allocated to increase the check-printing speed to 1,500 checks per minute. In one embodiment, all workloads associated with a service level objective execute in a single resource group, and resources are allocated to the resource group to satisfy the service level objective. For example, all workloads associated with the check-printing application would be executed in a single resource group.

A service level objective may also include a utilization cap on system resources. For example, in a pay per use (PPU) model, the user may purchase and receive only a portion of the total system resources, e.g., by setting the utilization cap at 80%. Service level objectives, including utilization caps, may be assigned priorities. System resources are allocated to satisfy service level objectives based on their orders of priority. The utilization cap may be a maximum cap on average utilization, such that actual utilization may be permitted to fluctuate above and below, so long as the average utilization does not exceed the cap. In one embodiment, the system allows the utilization cap to have a lower priority than one or more other service level objectives. This allows utilization to exceed the utilization cap for the higher priority service level objectives. One embodiment also includes a recapture period for recapturing additional resources allocated to high priority workloads to ensure that average utilization does not exceed the utilization cap. One embodiment recaptures the additional resources immediately after the higher priority service level objectives no longer require the additional resources. The system may recapture the additional resources by imposing a recapture limit lower than the utilization cap that limits allocation of resources during the recapture period.

One example of prioritization of service level objectives is as follows:

| SLO | Priority | Definition |
| --- | --- | --- |
| SLO "A" | 1 | Workload 60 |
| SLO "B" | 2 | 80% Utilization Cap |
| SLO "C" | 3 | Workloads 61-63 |

In this example, service level objective A includes one workload, 60, and has a high priority of 1. For example, workload 60 might be a critical software application running on the system 10 that the user has determined should take precedent over the overall utilization cap when allocating resources. Service level objective B is a utilization cap of 80% in this example. Service level objective C includes three remaining workloads 61-63 and has the lowest priority in this example. The workloads 61-63 may be software applications of less importance than the high-priority workload 60.

To ensure that system resources are allocated according to service level objectives, the system 10 includes a usage meter 70 that monitors usage of the resources. In one example, CPU resources are allocated subject to the service level objectives. The usage meter 70 receives resource utilization data from the CPU 20 and delivers the data to a resource allocator 80. The resource allocator 80 allocates and reallocates resources among workloads 60-63 dynamically as the workloads 60-63 execute, according to the service level objectives.

Figure 2:
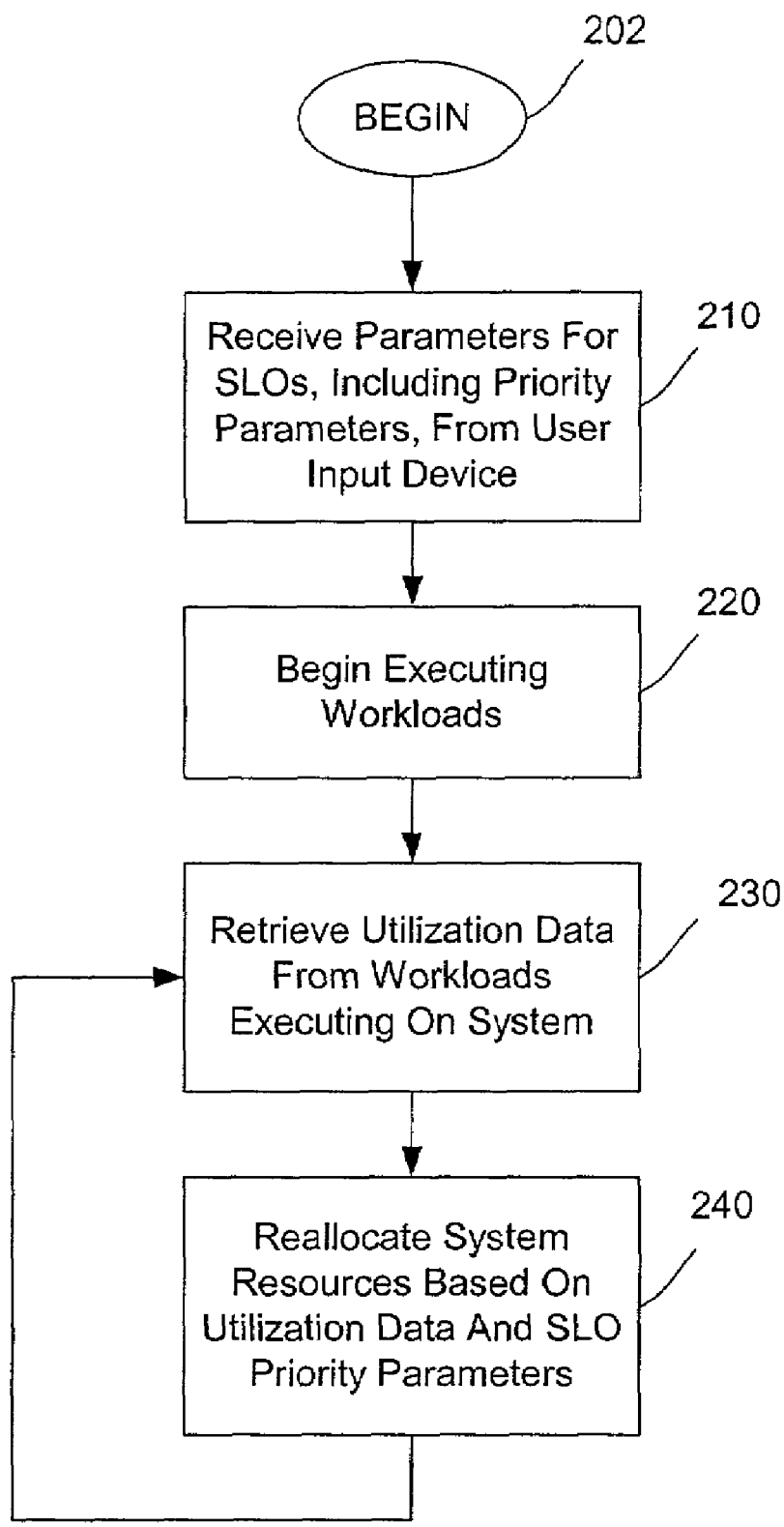
FIG. 2 is a flow chart of a method of allocating system resources.

FIG. 2 is a flow chart of a method of allocating system resources. The method begins 202 and parameters are received for service level objectives 210. The parameters include priority parameters indicating each service level objective's priority to resources. Workloads (blocks 60-63 in FIG. 1) begin to execute 220, and system resources are allocated initially among workloads (blocks 60-63 in FIG. 1) based on the service level objective priority parameters. As the workloads (blocks 60-63 in FIG. 1) use the resources, utilization data is retrieved dynamically 230 from the workloads (blocks 60-63 in FIG. 1). Based on the utilization data, system resources are reallocated 240 by the resource allocator (block 80 in FIG. 1) such that the allocation of resources comports with the service level objective priority information. The method then loops back and repeats the process of retrieving utilization data 230 dynamically as the workloads (blocks 60-63 in FIG. 1) use resources and reallocates the resources 240 based on the utilization data and subject to the service level objective priority parameters.

Figure 3:
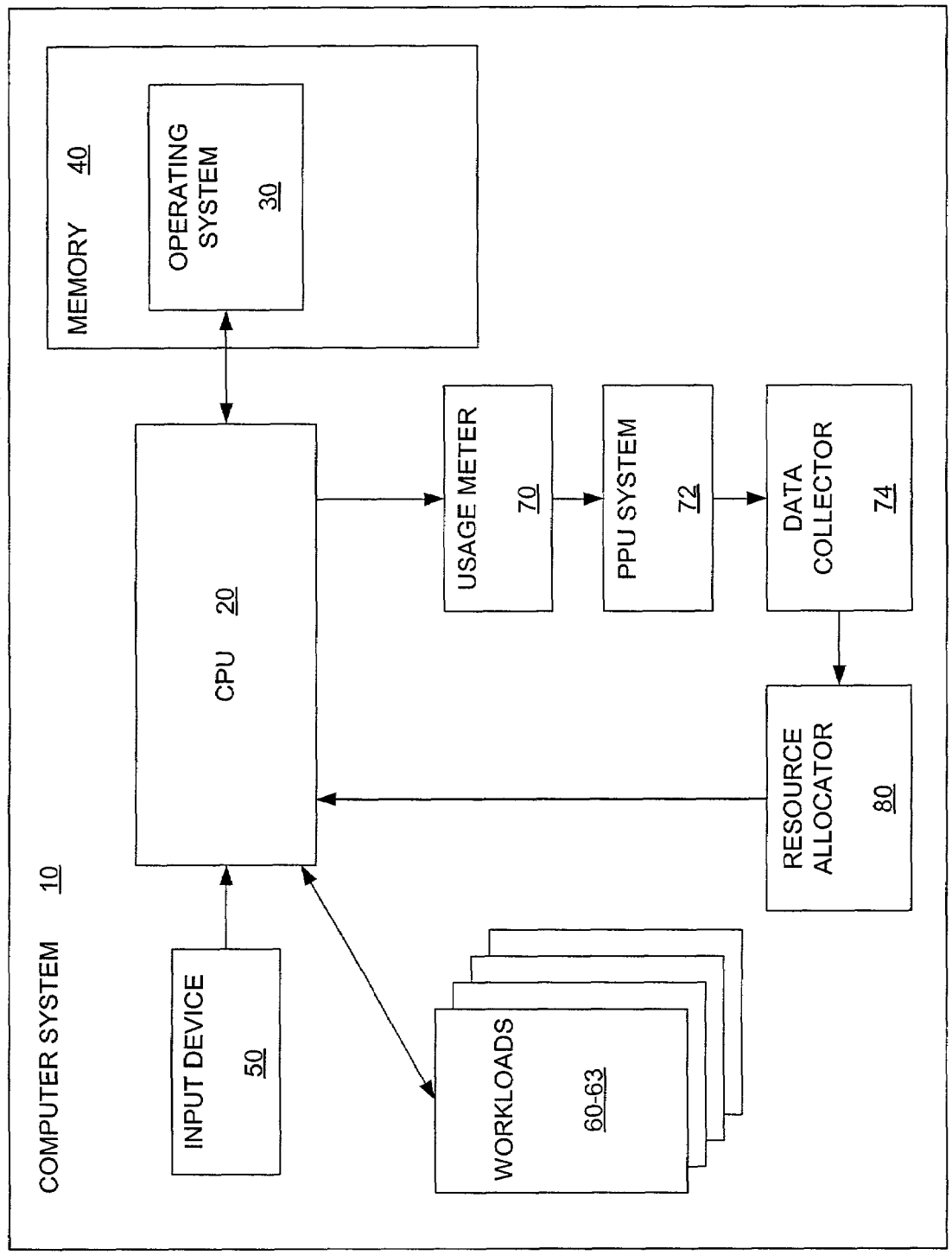
FIG. 3 is a more detailed block diagram of one embodiment of the computer system shown in FIG. 1.

FIG. 3 is a more detailed block diagram of one embodiment of the computer system 10 shown in FIG. 1. In the embodiment shown in FIG. 3, usage meter 70 provides the utilization data to the PPU system 72. The usage meter 70 collects the utilization data for the workloads 60-63 operating on the system 10 from the CPU 20 and sends the utilization data to the PPU system 72. In one embodiment, the PPU system 72 stores the utilization data with a simple network management protocol (SNMP) agent or a web-based enterprise management/common information model (WBEM/CIM) provider (not shown). Based on the utilization data, the PPU system 72 bills the user for usage of the system 10 resources during a billing period (e.g., monthly), according to an agreement between the user and the owner of the system 10 resources. A data collector 74 collects the utilization data from the PPU system 72 and delivers the utilization data to the resource allocator 80. Based on the utilization data, the resource allocator 80 reallocates system 10 resources among workloads 60-63 according to the service level objectives.

Figure 4:
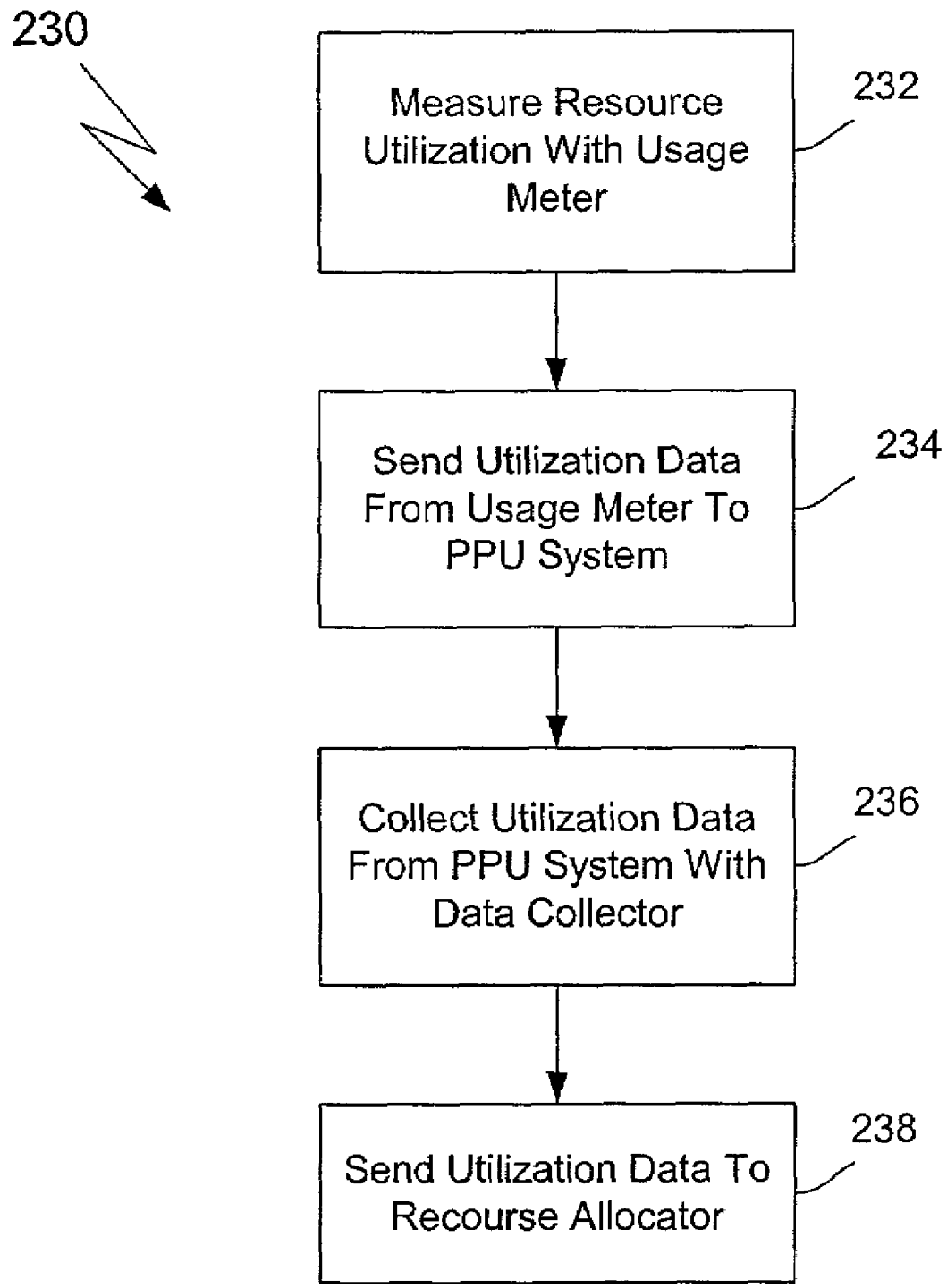
FIG. 4 is a flow chart of a method of retrieving utilization data from workloads executing on the computer system.

FIG. 4 is a flow chart of a method of retrieving utilization data (block 230 in FIG. 2) from workloads (blocks 60-63 in FIG. 3) executing on the computer system 10, used by the example shown in FIG. 3. Utilization of system 10 resources is measured 232 using a usage meter (block 70 in FIG. 3). The usage meter (block 70 in FIG. 3) sends 234 the utilization data to the PPU system (block 72 in FIG. 3), which stores the utilization data and bills the user based on resource usage. The data collector (block 74 in FIG. 3) collects 236 the utilization data from the PPU system (block 72 in FIG. 3) and sends 238 the utilization data to the resource allocator (block 80 in FIG. 3).

Figure 5A:
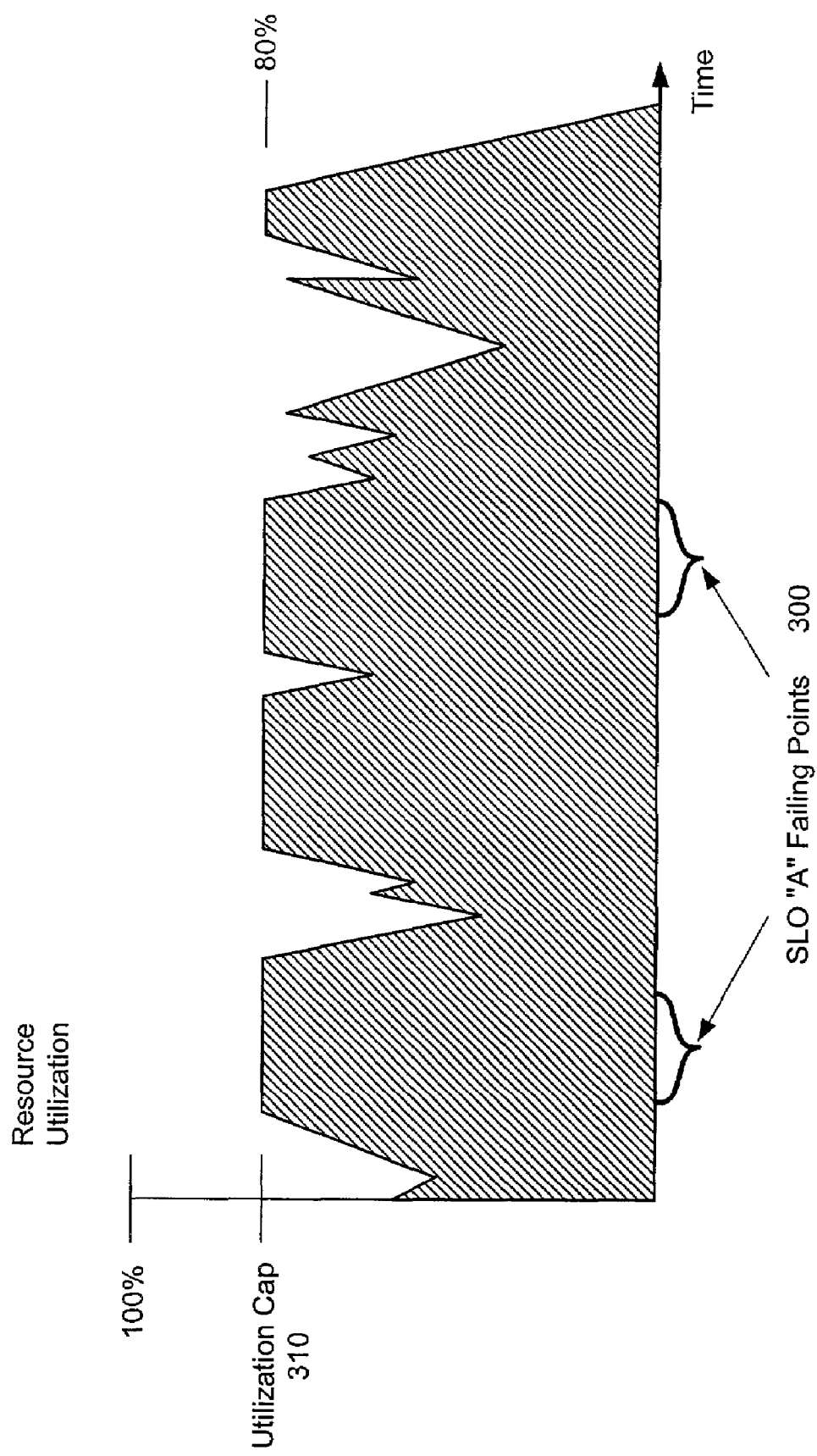
FIG. 5A is a graph showing an example of utilization of system resources over time, subject to a utilization cap.

FIG. 5A is a graph showing an example of utilization of system 10 resources, such as CPU resources, over time, subject to a utilization cap 310. Referring to the example described above with respect to FIG. 1, the utilization cap 310 defines service level objective B. At different times, use of system resources by the workloads (blocks 60-63 in FIG. 1) varies depending upon the workloads' actual demand for the resources. Utilization of the resources is determined dynamically (block 230 in FIG. 2), by the usage meter (block 70 in FIG. 1) as the workloads (blocks 60-63 in FIG. 1) use the resources. The resources are then reallocated (block 240 in FIG. 2) according to service level objectives. The use of resources is subject to the utilization cap 310, which limits use to a maximum value or percentage of total system 10 resources. The utilization cap 310 may be implemented in connection with a PPU model in which the user has purchased only a portion of the total system 10 resources, as represented by the utilization cap 310. In the example of FIG. 5A, the utilization cap 310 is set at 80% of total system 10 resources. For example, if the system resource is CPU resources, then the use of the CPU resources would be capped at 80% as shown in FIG. 5A.

In the example of FIG. 5A, whenever actual resource usage reaches the utilization cap 310, one or more service level objectives may be failing because they are requesting more resources than the utilization cap 310. In the example of FIG. 5A, the service level objective A is failing at certain failing points 300, which include portions of two of the flat portions of the graph where resource usage has reached the utilization cap 310. Depending upon the importance of the failing service level objectives, the limitation imposed by the utilization cap 310 may be undesirable. In this example, if service level objective A is an important or high-priority service level objective, then failure to satisfy that objective may result in a breach of a service contract by the user or other undesirable consequences for the workload(s) related to service level objective A. Referring to the example above in which service level objective A has been given a priority greater than the utilization cap 310 that defines service level objective B, it is more desirable to allocate additional resources in excess of the utilization cap 310 to the workload 60 associated with service level objective A than it is to limit service level objective A's performance.

Figure 5B:
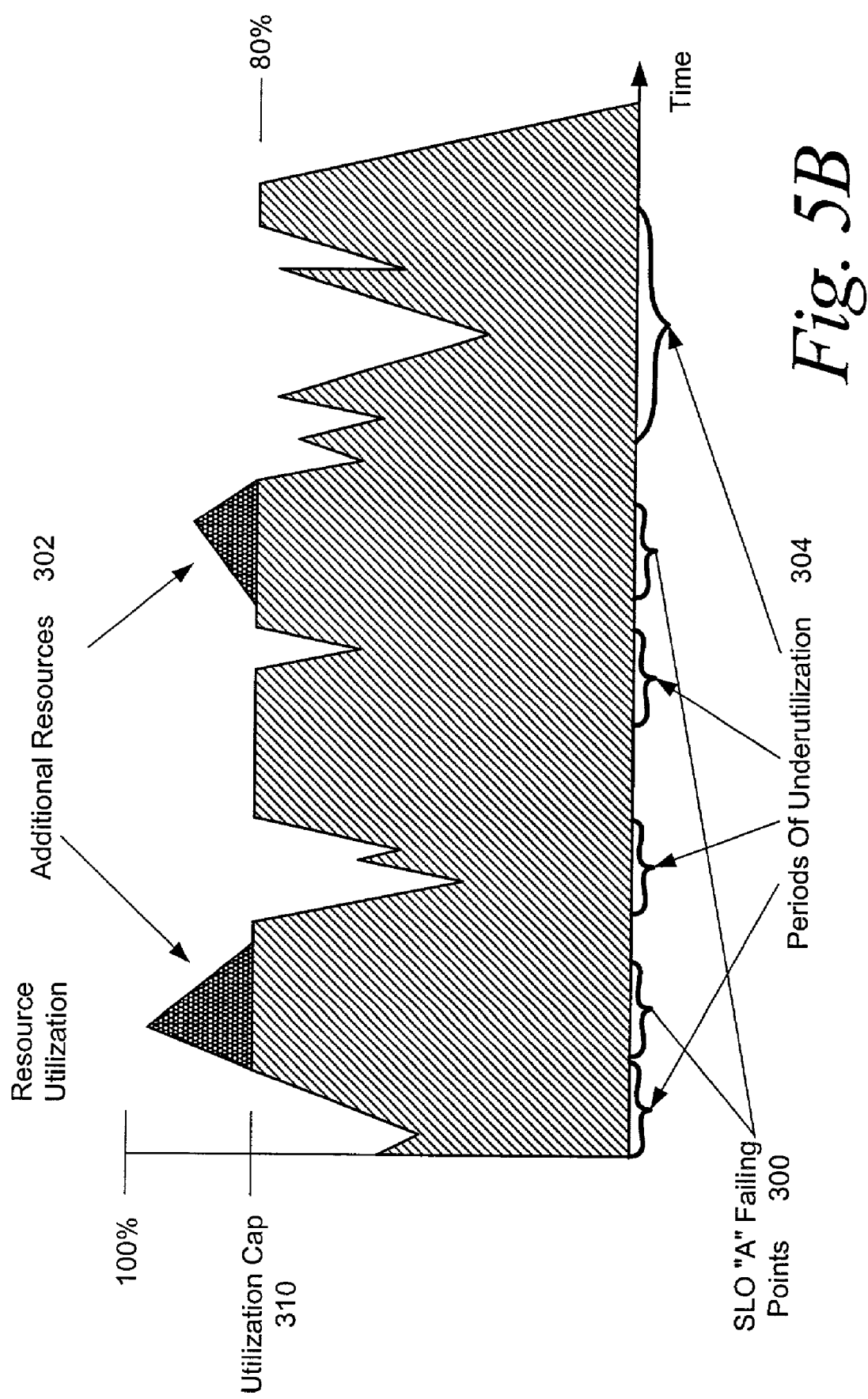
FIG. 5B is a graph showing allocation of additional resources in excess of the utilization cap for the utilization example of FIG. 5A.

FIG. 5B is a graph showing allocation of additional resources 302 in excess of the utilization cap 310 for the utilization example of FIG. 5A. In the example of FIG. 5B, service level objective A has a priority greater than the priority of the utilization cap 310 that defines service level objective B. Additional resources 302 have been allocated to the workload 60 associated with service level objective A during the periods indicated as service level objective A's failing points 300 so that service level objective A no longer fails. In the example of FIG. 5B, there are various periods of underutilization 304 in which demand for system 10 resources does not reach the utilization cap 310. In this example, the underutilization of system 10 resources during the periods of underutilization 304 exceed the additional resources 302 allocated to service level objective A at the failing points 300. The utilization cap 310 in this example refers to average utilization, and the average utilization is below the cap 310 notwithstanding the allocation of the additional resources 302. The workloads (blocks 60-63 in FIG. 1) have effectively given back the additional resources 302, during the periods of underutilization 304.

In other examples or at other periods of time, there may be a greater demand for the system 10 resources. The periods of underutilization 304, if any, may be less than the additional resources 302 allocated during failing points 300. To ensure recapture of the additional resources 302 in situations involving high usage of resources, the resource allocator (block 80 in FIG. 1) may include a recapture period during which the additional resources are recaptured, as described herein.

Figure 6:
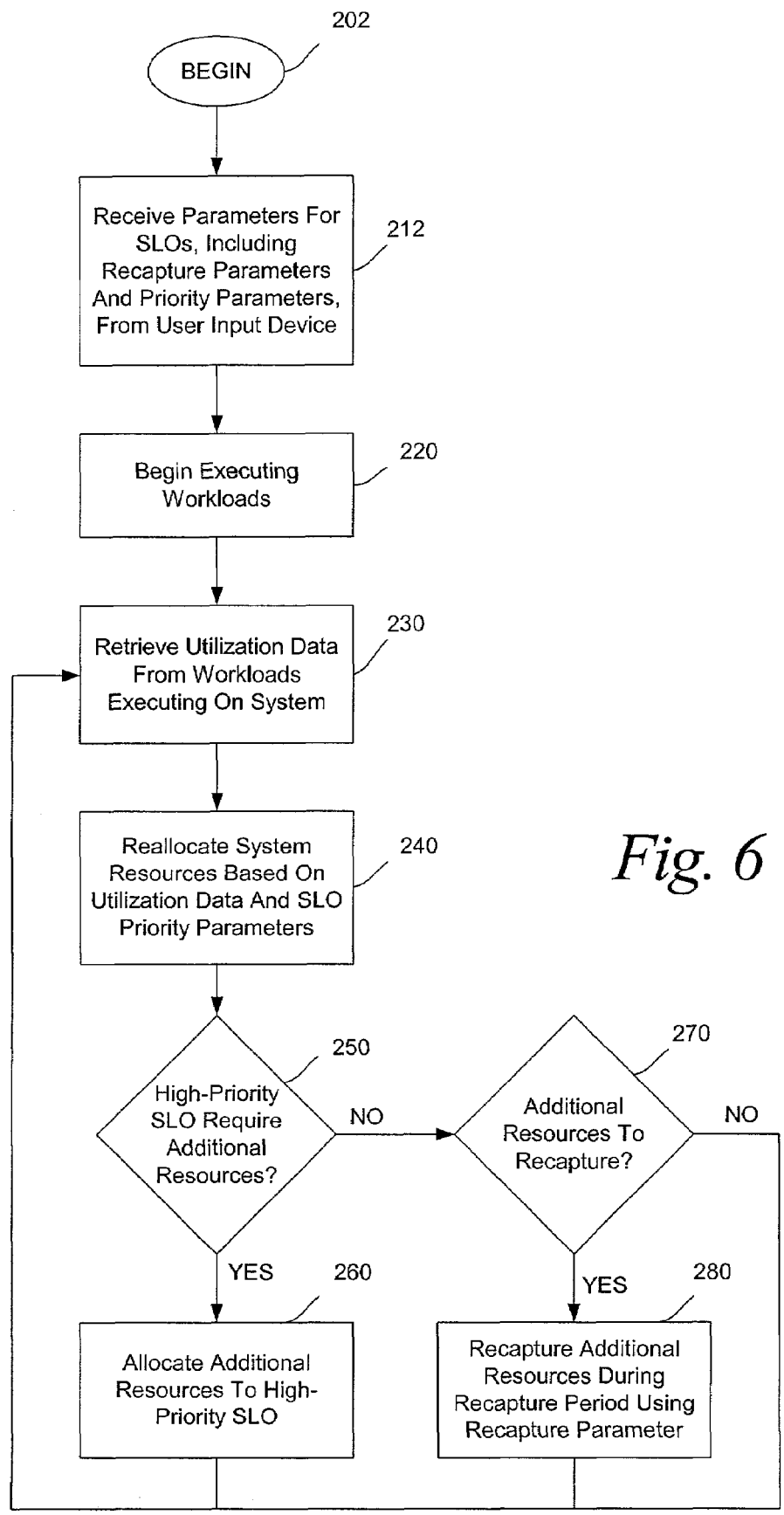
FIG. 6 is a flow chart showing a method of allocating system resources, including steps to recapture the additional resources allocated in excess of a utilization cap.

FIG. 6 is a flow chart showing a method of allocating system resources, including steps to recapture the additional resources (302 in FIG. 5B) allocated in excess of a utilization cap (310 in FIGS. 5A-B). The method may be implemented, for example, by the resource allocator (block 80 in FIG. 1). The method may be embodied in computer-executable instructions stored on a computer-readable medium, such as a memory. The method begins 202 and receives parameters for service level objectives 212. The parameters include priority parameters and recapture parameters. The recapture parameters refer to any parameters used to recapture additional resources (302 in FIG. 5B). Recapture parameters include, for example, a recapture limit that is imposed on allocation of system resources, which is lower than the utilization cap (310 in FIGS. 5A-B) and a recapture period during which additional resources (302 in FIG. 5B) are recaptured.

Workloads (blocks 60-63 in FIG. 1) begin execution using system resources 220, and resources are initially allocated to the workloads (blocks 60-63 in FIG. 1) based on the service level objective priority information. As the workloads (blocks 60-63 in FIG. 1) use resources, utilization data is received 230 using the usage meter (block 70 in FIG. 1) that reports the utilization data to the resource allocator (block 80 in FIG. 1). Resources are reallocated 240 based on the utilization data. The resource allocator (block 80 in FIG. 1) also determines 250 whether there is a service level objective with a higher-priority than the utilization cap (310 in FIGS. 5A-B), that has reached a failing point (300 in FIGS. 5A-B) and requires additional resources (302 in FIG. 5B). If there is a higher priority service level objective that has reached the utilization cap (310 in FIGS. 5A-B), then additional resources (302 in FIG. 5B) are allocated 260 to satisfy the service level objective. The method loops back and again receives new utilization data 230 and reallocates resources based on the utilization data 240 and service level objectives.

If there are no high-priority service level objectives failing ("no" at block 250) at the utilization cap (310 in FIGS. 5A-B), the method determines 270 whether there are additional resources (302 in FIG. 5B) that need to be recaptured. If additional resources (302 in FIG. 5B) have been previously allocated and have not yet been recaptured, then the additional resources (302 in FIG. 5B) are recaptured 280 during a recapture period using the recapture parameters specified by the user. The method loops back and again receives new utilization data 230 and reallocates resources based on the utilization data 240.

The resources may be recaptured by triggering a recapture period during which a recapture limit is imposed on allocation of system 10 resources. This effectively imposes a lower utilization cap (referred to herein as the "recapture limit") on resource allocation while there are outstanding additional resources (302 in FIG. 5B) to recapture. In one embodiment, the additional resources are recaptured during a recapture period immediately following the allocation of the additional resources, and the recapture period lasts until all of the additional resources are recaptured, so long as the higher-priority service level objectives do not again require the additional resources. In another embodiment, the recapture limit is imposed for a fixed recapture period defined by a user as a recapture parameter, without regard to the amount of the additional resources (302 in FIG. 5B) recaptured.

In one embodiment, the resource allocator (block 80 in FIG. 1) determines 270 whether there are additional resources (302 in FIG. 5B) to recapture by tracking a running average of the total resources allocated throughout a billing period used by the PPU system (block 72 in FIG. 3) and comparing the running average to the utilization cap (310 in FIG. 5A-B). Whenever the running average exceeds the utilization cap (310 in FIG. 5A-B), the recapture limit is imposed to recapture the additional resources (302 in FIG. 5B), so long as service level objectives having higher priorities than the utilization cap (310 in FIG. 5A-B) do not require the additional resources (302 in FIG. 5B). The result of this implementation is to limit allocation of resources to the recapture limit during recapture periods immediately following periods in which additional resources (302 in FIG. 5B) have been allocated. In one embodiment, the running average is reset at the beginning of each billing period used by the PPU system (block 72 in FIG. 3). In this embodiment, the total resources allocated may exceed the utilization cap for a billing period, for example, if a high-priority service level objective requires additional resources (302 in FIG. 5B) near the end of the billing period and the resource allocator does not have sufficient time to recapture the additional resources (302 in FIG. 5B) using the recapture limit.

If there are no additional resources (302 in FIG. 5B) to recapture ("no" branch at block 270), then the method loops back and again receives new utilization data 230 and reallocates the resources based on the utilization data 240, without imposing a recapture limit or other limitation to recapture the additional resources (302 in FIG. 5B).

Figure 7:
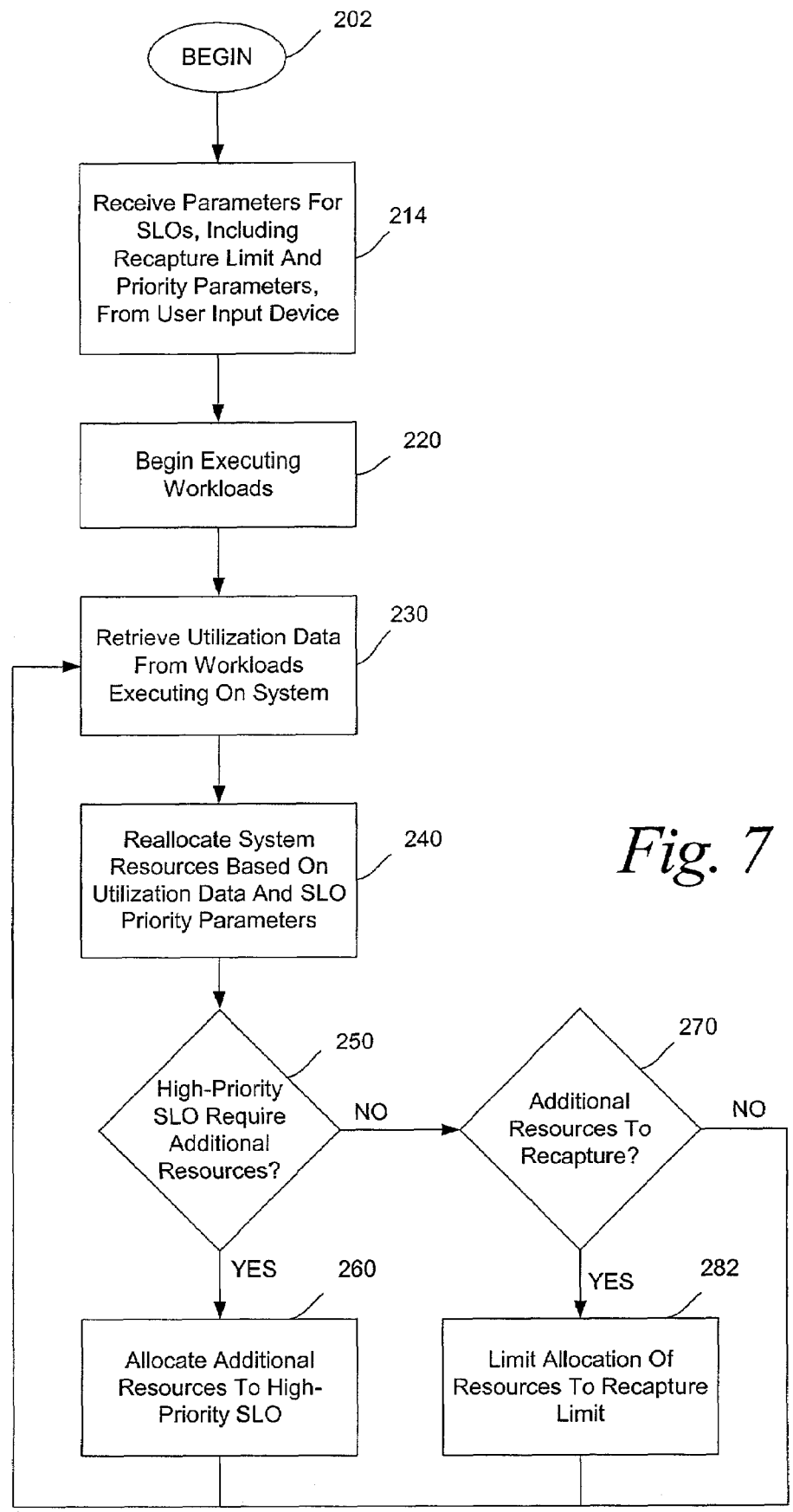
FIG. 7 is a flow chart showing one implementation of the method described with respect to FIG. 6, in which a recapture limit is used to recapture the additional resources.

FIG. 7 is a flow chart of a particular implementation of the method shown in FIG. 6 in which a recapture limit is used to recapture the additional resources (302 in FIG. 5B). The example method shown in FIG. 7 recaptures additional resources by effectively lowering the available system resources below the utilization cap (310 in FIG. 5A-B) during a recapture period following the allocation of additional resources (302 in FIG. 5B) to satisfy service level objectives having priorities higher than the priority of the utilization cap (310 in FIG. 5A-B). In the example of FIG. 7, the method begins 202 and receives priority and recapture parameters for service level objectives 214. The recapture parameters include a recapture limit, which is a value used to impose a utilization limit lower than the utilization cap (310 in FIGS. 5A-B). The method begins executing workloads 220 and retrieves utilization data 230 for the workloads (blocks 60-63 in FIG. 1) as the workloads (blocks 60-63 in FIG. 1) execute. Based on the utilization data and the service level objective priority parameters, resources are reallocated 240 among the workloads (blocks 60-63 in FIG. 1). As the workloads (blocks 60-63 in FIG. 1) execute, additional resources (302 in FIG. 5B) are allocated 260 to high-priority service level objectives, if the high-priority service level objectives reach the utilization cap (310 in FIGS. 5A-B) ("yes" branch at 250). If there are no high-priority service level objectives requiring additional resources (302 in FIG. 5B), then the resource allocator (80 in FIG. 1) determines whether there are additional resources (302 in FIG. 5B) to recapture 270. If there are additional resources (302 in FIG. 5B) to recapture ("yes" branch at 270), the recapture limit specified by the user input device (block 50 in FIG. 1) is imposed 282 to limit the total system 10 resources available for allocation to the workloads (blocks 60-63 in FIG. 1). The resource allocator (block 80 in FIG. 1) then loops back and receives new utilization data 230 for the workloads (blocks 60-63 in FIG. 1).

Figure 8A:
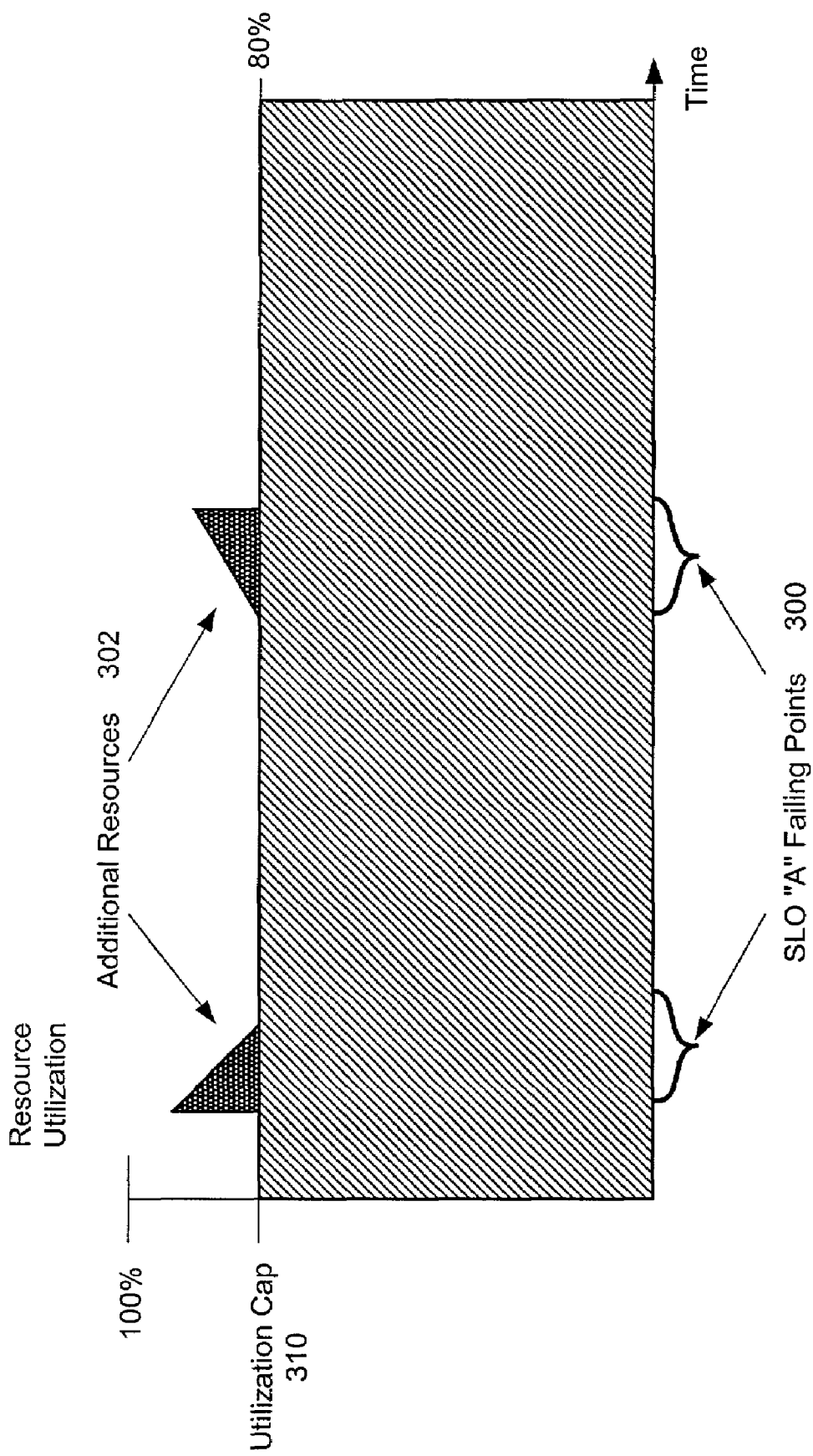
FIG. 8A is a graph showing an example of utilization of system resources over time, subject to a utilization cap, in which the usage of the resources reaches the cap throughout the time period shown.

FIG. 8A is a graph showing an example of utilization of system 10 resources over time, subject to a utilization cap 310. FIG. 8A illustrates a situation of high utilization of system resources, in which the usage reaches the utilization cap 310 for the entire period shown, and exceeds the cap 310 for two periods during which additional resources 302 are allocated to a higher-priority service level objective (SLO "A") at the failing points 300 for service level objective A. The failing points 300 and allocation of additional resources 302 of the usage graph of FIG. 8A correspond to the failing points 300 and allocation of additional resources 302 shown in FIG. 5B. Comparing FIGS. 5B and 8A, FIG. 8A represents a situation of higher utilization of system 10 resources by lower priority service level objectives, for example, service level objective C in the example described above with respect to FIG. 1. The utilization cap 310 is imposed and limits the allocation of the resources to satisfy service level objectives having lower priorities than the priority of the utilization cap 310.

Figure 8B:
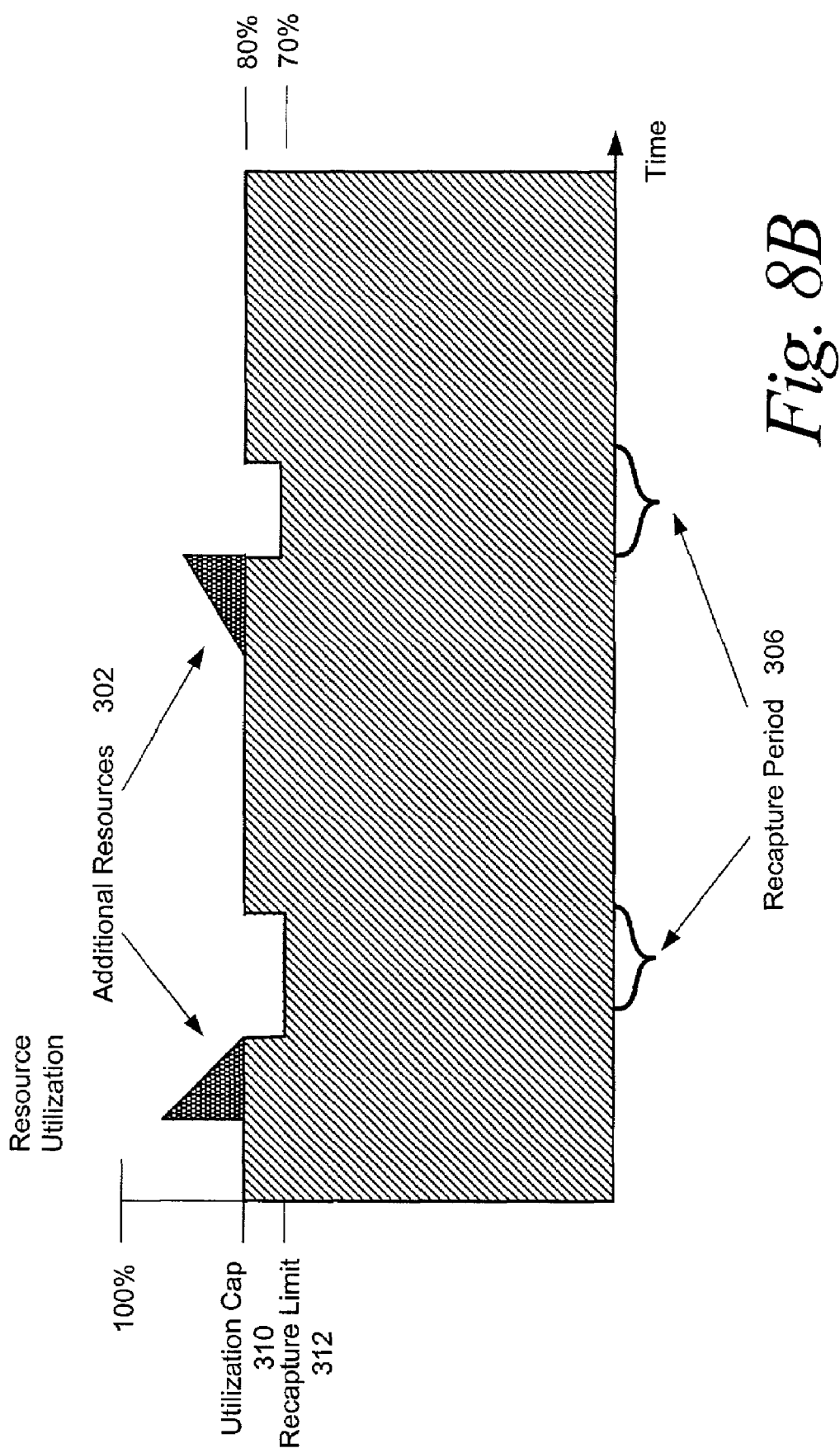
FIG. 8B is a graph showing recapture of the additional resources in excess of the cap for the example utilization shown in FIG. 8A.

FIG. 8B is a graph showing recapture of the additional resources 302 in excess of the utilization cap 310 for the example utilization shown in FIG. 8A. FIG. 8B reflects the utilization after implementation of the method described in FIG. 7 to recapture additional resources 302. Parameters are received (block 210 in FIG. 7) from a user input device (block 50 in FIG. 1) specifying a recapture limit 312. The recapture limit 312 is the limit imposed during the recapture period 306, which recapture limit 312 is lower than the utilization cap 310. In the example shown in FIG. 8B, the utilization cap 310 is set at 80% and the recapture limit is set at 70%. During a recapture period 306 immediately following the allocation of the additional resources 302, the recapture limit 312 is applied to limit availability of system 10 resources in order to recapture the additional resources 302. The recapture period 306 in this example extends until the additional resources 302 have been recaptured.

In an alternative embodiment, the additional resources 302 are tracked and the recapture limit 312 is imposed periodically to recapture the aggregated additional resources 302. For example, a system may impose the recapture limit 312 once per month so that a user's monthly utilization fits within the utilization cap 310. The recapture limit 312 may be implemented as a service level objective and given a priority. Another implementation may allow higher-priority service level objectives to exceed the recapture limit 312, if necessary.

In one example implementation, the method for allocating system 10 resources subject to a utilization cap 310 is incorporated into the HP-UX Workload Manager product (WLM) manufactured by Hewlett-Packard Company, which is used as the resource allocator (block 80 in FIG. 3). Utilization caps 310 are imposed using the WLM's service level objective configurations and the PPU system (block 72 in FIG. 3). The utilization data may be sent from the PPU system (block 72 in FIG. 3) to the WLM as a metric using the wlmsend command in the WLM. To enable recapture of additional resources 302, syntax and functionality may be added to the WLM to allow the user to specify a recapture limit 312, a priority for recapture, and a recapture time.

Example syntax for a utilization structure specifying a utilization cap 310 and recapture parameters for the WLM may be specified as follows:

```
utilization {
    pri = priority;
    goal = metric metric-name < percentage;
    [recapture_limit = percentage;]
    [period = duration start;]
{
```

The priority is a parameter specified for the priority of the utilization cap 310 relative to other service level objectives. In one embodiment, the utilization cap 310 is satisfied before other service level objectives having the same priority. The utilization cap 310 has as a goal keeping its utilization below a specified percent of total system 10 resources. The example syntax in brackets relates to optional recapture of system 10 resources using a recapture limit. A recapture limit 312 may be specified as a percentage of total system 10 resources. A period may be specified for imposing the recapture limit 312. The period may be a billing period used by the PPU system (block 72 in FIG. 3), for example, daily, weekly, monthly, etc. A running average of system resource utilization may be tracked by the WLM and may be re-initialized at the beginning of each period. The WLM may determine whether the running average exceeds the utilization cap (310 in FIG. 5B), and may trigger the recapture limit 312 if the average utilization exceeds the utilization cap (310 in FIG. 5B), to attempt to keep average utilization below the utilization cap (310 in FIG. 5B). To control overall utilization, the WLM may uses a process resource manager (PRM) group (not shown) to allocate resources. The PRM group prevents the user from executing any processes in that group. The PRM group may be automatically created by the WLM when a utilization structure is defined.

An example utilization structure for the recapture example shown in FIG. 8B is as follows:

```
# utilization structure

# Define utilization with goal of 80% maximum utilization.

utilization {
    pri = 2;              # Similar to SLO priority.
    goal = metric total_utilization < 80;
    recapture_limit = 70; # Optional limit to be used for recapture
    period = monthly */01/*; # Utilization tracked monthly
                           # starting 1st
}

# tune structure

# Use wlmsend to provide the usage metric.

tune total_utilization {
    coll_argv = wlmrcvdc;
}
```

In this example, the utilization cap 310 is set at 80% of system 10 resources and the priority for the utilization cap 310 is set at 2, as described in the examples above. Only service level objectives with priorities higher than 2, such as service level objective A described above, are allowed to exceed the utilization cap 310. A recapture limit 312 of 70% has been specified, limiting allocation of system 10 resources to 70% of total system 10 resources during the recapture period 306. The billing period used by the PPU system (block 80 in FIG. 3) is monthly, beginning on the first of each month. On the first of each month, the WLM resets the running average used to determine whether there are additional resources 302 to be recaptured (block 270 in FIG. 7). The tune structure defined near the bottom of this example code specifies for the data collector (block 74 in FIG. 3) the source of the utilization data.

Although the present invention has been described with respect to particular embodiments thereof, variations are possible. The present invention may be embodied in specific forms without departing from the essential spirit or attributes thereof In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; data transmitted over the Internet or other network; or other forms of RAM or read-only memory (ROM). It is desired that the embodiments described herein be considered in all respects illustrative and not restrictive and that reference be made to the appended claims and their equivalents for determining the scope of the invention.

The invention claimed is:

1. A computer system that dynamically allocates computer system resources among workloads subject to a utilization cap, comprising:
   a processor;
   a memory connected to the processor;
   a usage meter that determines utilization of system resources by workloads;
   a resource allocator that receives utilization data from the usage meter as the workloads execute and allocates the system resources to the workloads according to priorities associated with each of a plurality of service level objectives for execution of the workloads, subject to a utilization cap having a priority;
   wherein the resource allocator determines whether a workload requires resources in excess of the utilization cap; and
   allocates additional resources the workload if the workload is associated with a service level objective that has a higher priority than the priority of the utilization cap;
   wherein the resource allocator recaptures the additional resources using recapture parameters including a recapture limit that limits the allocation of resources below the utilization cap, during a recapture period;
   a pay per use (PPU) system that receives utilization data from the usage meter and changes a user for use of the system resources during a billing period, based on the utilization data; and
   a data collector that sends the utilization data from the PPU system to the resource allocator,
   wherein the recapture limits is imposed during the billing period to limit and average utilization of resources during the billing period to the utilization cap, if there are additional resources to recapture.

2. The computer system of claim 1, wherein the resource allocator
   allocates resources to workloads to satisfy service level objectives having higher priorities before satisfying service level objectives having lower priorities; and
   limits allocation of resources to the utilization cap.

3. The computer system of claim 1, further comprising:
   a pay per use (PPU) system that receives utilization data from the usage meter and periodically bills a user for use of the system resources based on the utilization data; and
   a data collector that sends the utilization data from the PPU system to the resource allocator.

* * * * *